Oct. 25, 1938.   J. L. CREVELING   2,133,976
ELECTRIC SYSTEM
Filed March 12, 1935
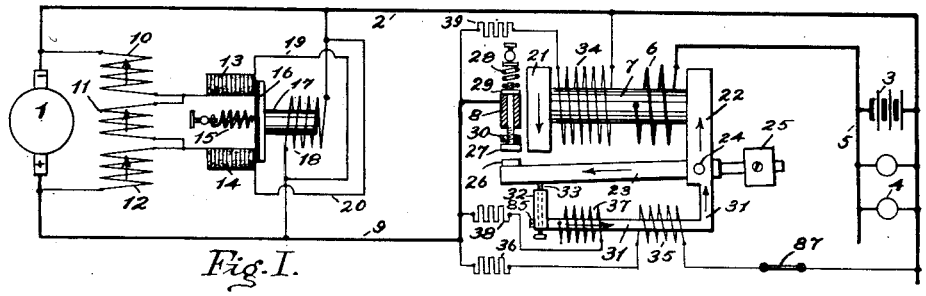
Fig. I.
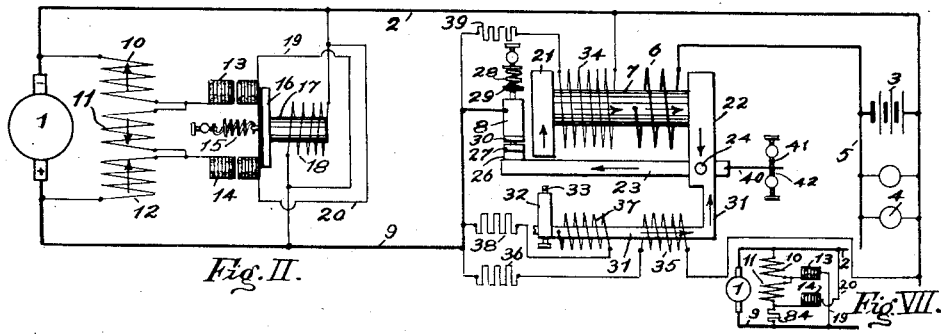
Fig. II.   Fig. VII.
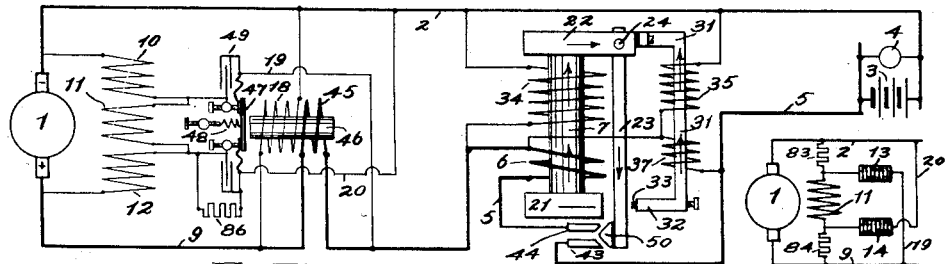
Fig. III.   Fig. VI.
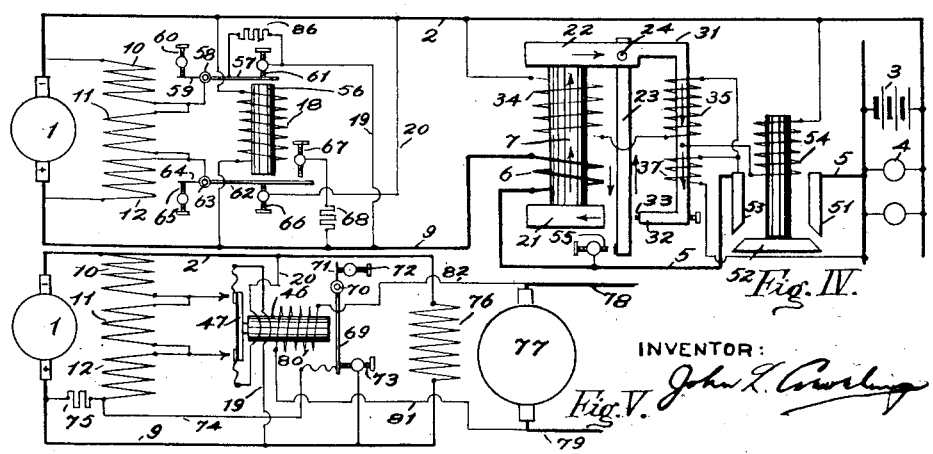
Fig. IV.
Fig. V.
INVENTOR:
John L. Creveling Patented Oct. 25, 1938

2,133,976

UNITED STATES PATENT OFFICE 2,133,976

ELECTRIC SYSTEM

John L. Creveling, near Tucson, Ariz., assignor to The Safety Car Heating & Lighting Company, a corporation of New Jersey Application March 12, 1935, Serial No. 10,646

2 Claims. (Cl. 171—314)

My invention pertains to that class of electric systems wherein a dynamo or other controllable source of potential difference is to be regulated automatically throughout tendencies to vary.

As a dynamo driven at variable speed and employed to charge a storage battery and operate lamps or other translating devices is a widely used type of system to which my invention is particularly applicable, it will be described with respect to such a system.

An object of my invention is to provide means whereby the source of potential difference may be regulated automatically within relatively very narrow limits throughout wide range of tendency to vary.

Another object is to provide means whereby the source may be connected automatically with the circuit to be supplied whenever able to supply the same and disconnected therefrom whenever unable to perform this function.

Another object is to provide means for connecting the source with a load, including a variable counter-electromotive force, at such times as the source has the instant voltage of said counter-electromotive force, and to cause disconnection at substantially such time as the voltage of the source and the counter-electromotive force are practically equal.

Another object is to provide simple, reliable and rugged means for attaining the above objects.

Other objects will be apparent from the following specification.

In the drawing, Fig. I is a diagrammatic representation of one type of system comprehending my invention, the source of current and its load being disconnected.

Fig. II is a similar representation of a system wherein the source is indicated as supplying the load and requiring the maximum degree of regulation to be required.

Figs. III, IV, V, VI and VII, are diagrams showing modification that may be made in the embodiments of my invention.

In the drawing, referring particularly to Fig. I, 1 represents a dynamo or generator having one of its brushes connected as by wire 2 with one side of the storage battery 3 and lamps or other translating devices indicated at 4.

The other terminals of the lamps and battery are indicated as connected with the wire 5, which is led to one end of the coil 6, wound about the core 7 with which its opposite end may be connected, as shown. 6 and 7 are elements of means for connecting the dynamo and its load (to be more fully described later), comprising a member 8, insulated from 6 and 7, and connected by wire 9 with the remaining brush of the dynamo.

The dynamo 1 is shown as provided with a plurality of field windings 10, 11 and 12. The winding 10 has one terminal connected with the wire 2 and its other terminal connected with one end of a regulating device, in this instance indicated as a carbon pile 13, having its opposite end in electrical connection with the wire 9, as by wire 19. The winding 12 has one terminal connected with the wire 9, and its opposite terminal connected with a regulating device (indicated as a carbon pile 14), having its remaining terminal connected with the wire 2, as by wire 20. The winding 11 is shown as connected across the ends of windings 10 and 12, between the coils and piles 13 and 14. A spring 15, acting upon the yoke 16, insulated from the piles as shown, tends to compress the piles and lower their resistance; while the core 17, when attracted by the coil 18 across wires 2 and 9, tends to increase the resistance of the piles.

The previously mentioned core 7 is of iron or other magnetic material and is provided with a pole piece 21, a yoke 22 and armature 23, pivoted as at 24, and which may be counter-balanced to any degree desired, as by counter-weight 25. Attraction between pole piece 21 and armature 23 tends to raise the free end of the armature and bring the contact member 26 into contact with a similar member 27, provided with a stem which is indicated as pressed downwardly by an adjustable spring 28. The downward travel of 27 is limited by the nut 29, while its upward travel against the effort of spring 28 is limited by nut 30.

The yoke 22 carries an extension 31, provided with a pole piece 32, which may be adjustably secured thereto as by screws 35 passing through slots (not shown) in 32 and permitting the same to be raised or lowered and held in position, in a well known manner. 31 and 32 are of magnetic material, and 31 is shown as provided with a screw 33, limiting the downward movement of armature 23, and this screw is, of course, of non-magnetic material. The core 7 is provided with a voltage winding 34 across the wires 2 and 9 through an adjustable resistance 39. The extension 31 is provided with a voltage winding 35 across wires 2 and 9 through a suitable adjusting resistance 36, if desired. 31 is also provided with a voltage winding 37, indicated as having one end connected with the said member 31 and the opposite end with wire 9 through an adjusting resistance 38, if desired. As one end of coil 6 is connected with the core 7, coil 37 is therefore, in effect, across the "break" between contact members 26 and 27, it being noted that in this figure the switch is open and the dynamo and battery disconnected.

In Fig. II, substantially the same instrumentalities are shown as in Fig. I, though in a different phase of operation, the only structural difference being that the counter-weight 25 is indicated as replaced in Fig. II by a leaf spring 40, which may have its effect upon the armature 23 adjusted by screws 41 and 42. In this figure, the switch is shown in its closed position, connecting the dynamo with its load, and the carbon piles 13 and 14 are in the extreme position of being open-circuited, to more plainly bring out the operation of coils 10, 11 and 12.

In Fig. III, the carbon piles of Figs. I and II are indicated as replaced by vibratory contacts affected by an armature 47, supported in a suitable manner (not shown), drawn toward the left by the adjustable spring 48 and toward the right by magnetization of the core 46, surrounded by the voltage winding 18 and series or current winding 45. The contacts may be shunted, of course, by condensers 49, resistances as shown at 86, or both, if desired, as is usual practice with this well known general type of device. In this figure, the wire 5 is carried to the contact member 43, and from the companion member 44 to the end of coil 6, which is "grounded", in Figs. I and II, to indicate that the switch may be of either the single or double break variety, as desired. The armature 23 carries an insulated contact bridge 50, and the entire mechanism is shown in a position revolved 90 degrees from that of Figs. I and II, so that the armature 23, under gravity alone, would tend to take a vertical position between pole pieces 21 and 32. The member 31 is indicated as having an air gap or a non-magnetic insert between its end and member 22, which may be employed, if desired.

In Fig. IV, the circuit through wire 5 is opened and closed by a contactor comprising the usual contact members 51, 52 and 53, operated by the coil 54, one end of which is shown as connected with wire 2, and the other end of which is connected with the wire 5 as through member 31, armature 23 and contact screw 55, when the armature is drawn toward pole piece 21. In this figure, the generator controlling coil is indicated as a voltage winding 18 upon a core 56, one end of which, when the coil is energized, attracts the vibratory armature 57 to control the contact with screw 61, connected with wire 9, as by wire 19. The member 57 may be pivoted as at 58 and have its operation adjusted by means of spring 59 and screw 60, in a well known manner. The opposite end of core 56 controls the vibratory contact mechanism 62, 63, 64, 65 and 66, in a manner obvious from the above, and thus controls the effective resistance in series with wire 20 and coils 11 and 12. The contact screw 67 is so arranged that when armature 62 is sufficiently raised it will make contact therewith and connect the resistance 68 as a shunt around coil 12.

In Fig. V, the dynamo 1 is shown as having one brush connected through wire 2 with one end of a field winding 76, of generator 77 supplying the leads 78 and 79, and the opposite end of said coil 76 is connected with the remaining brush of generator 1, by means of wire 9, to indicate that the dynamo 1 of any of the figures may be used as an exciter instead of as a main generator, as is well understood in the art. In this figure, the coils 10, 11 and 12 are indicated as affected by a vibratory contact device having an armature 47, as in Fig. III, which is here shown as in its extreme position against a non-magnetic stop carried by core 46, in which position the contacts controlled by 47 are both broken. The core 46 is indicated as surrounded by a voltage coil 80 across the main dynamo 77, which is controlled by regulating the exciter, in a well-known manner. The contact mechanism 69—70—71—72—73 is operated by attraction of core 46 to control the effective resistance in shunt to the resistor 75 in series with coil 12.

In Fig. VI, the coil 11 is as shown in the previous figures, while coils 10 and 12 are indicated as replaced by resistors 83 and 84, respectively.

In Fig. VII, coils 10 and 11 are shown as in Figs. I to V, while coil 12 of these figures is replaced by a resistor 84.

An operation of my invention is substantially as follows, referring first to Fig. I If the dynamo 1 be at rest, the lamps or translating devices 4 may be operated by the battery 3, in an obvious manner. If the upper brush of dynamo 1 be the negative, it will, of course, be connected with the negative side of the battery by wire 2, and the positive leg of the dynamo circuit will be broken at the contacts 26—27. A very feeble current will be shunted around the break through wire 5, coil 6, core 7, yoke 22, member 31 and coil 37, resistor 38, wire 9, dynamo 1 and wire 2 to battery 3. Coil 37 is of relatively high resistance on account of a large number of turns obtained by using fine wire and, therefore, its current consumption may be neglected in practice. This coil is here indicated as so wound as to tend to set up a magnetic flux in the direction of the arrow thereon, and also through the members 31, 23, 22, 7 and 21, in the directions indicated. By proper adjustment of air gaps between armature 23 and pole pieces 21 and 32, as may be accomplished through adjustment of the position of pole piece 32 and screw 33, the above mentioned excitation of coil 37 may be caused to firmly hold the armature 23 in the position indicated and insure maintainance of the break at 26—27, in a well known manner, so long as current flows from the battery through the dynamo and coil 37, as above outlined.

Now, if the dynamo be started and its speed gradually increased, its residual magnetism will cause a slight current to flow from the positive brush through coil 12, pile 14, wire 20 and wire 2 to the negative brush. Current will also flow from wires 9 and 19, pile 13 and coil 10, to wire 2 and also from wire 9 through wire 19, pile 13, coil 11, pile 14 and wire 20 to wire 2. And, if these coils 10, 11 and 12 are properly wound, they will all assist in building up the dynamo field and cause the dynamo to reach its normal voltage as soon as its so-called "critical" speed is reached.

Assuming that the piles 13 and 14 have negligible resistance until affected by coil 18, which condition is usually sought and nearly obtained in practice, and the coils 10, 11 and 12 so wound as to tend to set up fluxes in the direction of the arrows thereupon, it will be noted that the said coils are, in effect, all in multiple across the dynamo terminals and all working together to build up a strong field and permit the dynamo to reach the battery voltage at as low speed as possible. As the dynamo voltage increases from zero, the current flowing back from the battery through the dynamo and coil 37 will, of course, diminish and equal zero when the dynamo and battery are at equal voltages, at which time coil 37 will cease tending to hold the armature 23; whereas, should the dynamo voltage exceed that of the battery, the current in this coil will reverse and tend to cause a flux in the reverse direction to that indicated by the arrow in Fig. I.

Further, as the dynamo voltage increases from zero, current in proportion thereto will flow through coils 34 and 35, which may be so wound as to tend to set up fluxes as indicated by the arrows thereupon in Fig. II. By properly dimensioning the strength of these coils, which may be adjusted by means of resistors 36 and 39 (which may be in the form of adjustable resistors, if desired), and by properly adjusting the position of the armature 23 with respect to the pole pieces 21 and 32, I cause the armature 23 to be raised and close the contacts 26—27, as shown in Fig. II, when the dynamo voltage and the battery voltage are substantially equal or when either voltage is very slightly in excess of the other, as may be considered desirable. As the dynamo voltage rises above this point, current will be supplied by the dynamo in a well-known manner and, by flowing through coil 6, assist coil 34 in raising armature 23 against the action of spring 28 so as to reduce the airgap between 23 and 21 to the limit determined by nut 30, to cause a heavy pressure upon the contact and low resistance thereof. While the dynamo is active, current will flow through the coil 18, and this and its cooperating instrumentalities may be so arranged as to control the pressure upon the piles 13—14, in such manner as to prevent the dynamo voltage varying from a preselected value within very narrow limits throughout any tendency to vary, as upon speed changes, in a manner now well known in the art, provided the decrease in pressure upon the piles decreases the field excitation of the dynamo, and vice versa.

That this condition is fulfilled will be plain from Fig. II, wherein an extreme case is illustrated for sake of simplicity and the piles 13—14 indicated as having the pressure thereupon reduced to the point of opening the circuits therethrough. Here it will be noted that the coils 10, 11 and 12 are now in series with each other across the dynamo and that coil 11 has its effect reversed so as to "buck" the other coils instead of "boost", as when the dynamo was operating at low speed. It will be plain that, at a point between these limits, the current in coil 11 will have zero value and that the coils may be shifted from shunt to series relation with respect to each other without opening their circuits. Further, it will be seen that by properly proportioning the coils 10, 11 and 12, the field may be weakened to any desired extent without reaching the unstable range of the carbon piles and that the field may even be reversed, if desired. As the dynamo speed falls from a high value, coil 18 will so control the field as to hold the voltage substantially constant until the speed sinks below the point where full field will accomplish this, and then the current delivered by the dynamo will fall to zero and the contact at 26—27 may be caused to open at this point or upon very slight back discharge through coil 6, whereupon further fall in dynamo voltage will cause the current in coil 37 to set up the flux shown in Fig. I and hold the switch open.

The operation of the system as shown in Fig. III is substantially the same as above described with respect to Figs. I and II, save that a vibratory contact device instead of a carbon pile is used to control the field coils 10, 11 and 12, and this is shown as controlled by a voltage coil 18 and a series or current coil 45 which modifies the operation in a manner now well known in the art, and which is shown merely to indicate that the field regulator may be responsive to voltage, to current, or to both, as desired. In this figure, the "single break" contacts 26 and 27 are replaced by the "double break" contacts 43—44—50, insulated from the armature so that the same does not carry any current while the inter-action of the windings is modified by a non-magnetic member inserted between 22 and 31. The effects of these changes are so well known that it is believed further description of the operation at this point would be superfluous. With the armature 23 having a normally vertical mid-position, as shown in this figure, if it is released from one extreme position it will naturally tend to swing past the mid-position to very close to the opposite extreme, and, therefore, when released, may be drawn in one extreme or the other upon very slight differences in voltage above or below the instant voltage of the battery.

The operation of the arrangement in Fig. IV may be readily followed from the above, as it is only necessary to note that the core 56 of winding 18 need not affect the contacts 57–61 and 62–66 simultaneously but may affect one alone to perform a certain degree of regulation; and if further regulation is then required the other will come into action as may be determined by adjustment of springs 59 and 64 by means of screws 60 and 65. If breaking the contacts 57–61 and 62–66 does not provide sufficient range, it may be increased by using the contact device 67 and shunt 68 around coil 12, for example. This contact when made will weaken coil 12, which assists coil 10 under these conditions; and if coils 10 and 11 (not opposed to each other) are properly dimensioned, the net result will be a weakening of the field to a desired degree. In this figure, the switch coils 34 and 35 are shown in series with each other across the dynamo circuit and, obviously, may be arranged to perform the same function as the coils in the above figures where they are in multiple. Moreover, the connection of the dynamo and battery is here performed by the contactor operated by the coil 54 which has its circuit controlled by the contact between 23 and 55; and the use of the switch mechanism as a relay instead of a main connecting device is believed to be such an obvious arrangement as to require no further explanation. However, it will be noted that coils 35 and 37 have their connections reversed with respect to coils 6 and 34, so that they tend to set up fluxes in a direction opposed to that shown in the previous figures. With this arrangement proper adjustment of the parts will cause the contact at 23–55 to be made and broken at subtsantially zero difference of potential across the contacts throughout changes in battery voltage incident to charging, as is desired.

In the arrangement of Fig. V, the coils 10—11—12 are shown as primarily controlled by the same type of vibratory contact device as illustrated in Fig. III, though the one shown in Fig. V has its range increased by the contact device 69–73, which controls the shunt around the resistor 75, which is thrown in series with the field coils when the contact 69–73 is broken. This device may be adjusted by screw 72 so as to come into action only after the limit of operation of the contact relay operated by armature 47 has been reached, if desired. While in this figure the load is assumed as carried by a main generator 77, the voltage or current of which is controlled by controlling the field 10—11—12 of dynamo 1, it is believed that this change is so well known as to require no further explanation.

In Fig. VI, the coils 10 and 12 of the prior figures are shown as replaced by resistors 83 and 84, which ordinarily have a relatively high value, so as to cut down the loss at full field when the piles 13—14 have little resistance and the said resistors are, in effect, across the line. With this arrangement, increasing the resistance of the piles may gradually weaken the field to zero and even reverse the direction thereof, if necessary, in a manner plain from the above description of Figs. I and II.

In Fig. VII, coils 10 and 11 are shown as in the prior figures, while coil 12 is indicated as replaced by a resistance 84 which, of course, might replace coil 10 instead, with the same result, if the parts be properly proportioned. With this arrangement, coils 10 and 11 may be weakened, and then coil 11 may be reversed upon suitable increase in the resistance of piles 13—14, in a manner that will be plain from the foregoing.

From the foregoing it will be noted that many types of apparatus may be used in the employment of my invention and that given types of devices with different connections and proportioning and adjustment of the parts may be used to employ the invention, even though the individual effects of the parts may differ widely.

The various arrangements of field coils indicated are believed to be sufficient for illustration as it is plain that an indefinite number of relative values may be given to the parts shown to produce an indefinite number of precise net results, and that many changes in details of the regulating devices may be made without departing from the spirit of the invention.

While I have shown each of the devices employed for connecing the dynamo and battery as provided with coils 35 and 37, it will be noted that, in Figs. I, II and III, these tend normally to set up magnetic lines through the armature 23, in the same direction as the coil 34; and that in Fig. IV, these coils are reversed with respect to coil 34 (as indicated by the arrows on opposite sides of 23) to bring about substantially the same ultimate result; from which it will be plain that, in the structure of Fig. I, for example, if the switch 87 be opened so as to eliminate the effect of coil 35, proper adjustment of resistances 38 and 39 and the air gaps may cause the dynamo and battery to be connected and disconnected with substantially zero difference of potential across the contact 26—27, regardless of the direction of magnetomotive force of winding 37. Therefore, coil 35 may play an important part in the operation of connecting and disconnecting the dynamo and battery or be used as a mere adjusting coil for improving the accuracy and reliability of opening and closing, or even may be omitted, under certain circumstances.

In practice, I usually prefer the arrangement of coils shown in Figs. I, II and III, as it may easily be adjusted to operate very closely and, while closed, coil 35 tends to oppose the shunting effect of member 31, which, of course, may be controlled in the arrangement of Fig. IV, by properly proportioning the cross section of 31 so that it usually is practically saturated when the switch is closed.

I do not in any way limit myself to any of the exact constructions or details of operation here explained merely to point out embodiments of my invention, for it will be obvious that wide departure may be made in the way of apparatus and modes of operation without departing from the spirit and scope of my invention which is as set forth in the following claims:

I claim:

1. An electric system including a generator, a storage battery and means automatically connecting and disconnecting the same at times when their voltages are substantially equal throughout substantial changes in battery voltage incident to charging and discharging comprising a movable magnetic member, a yoke of magnetic material in close magnetic relation to one end thereof and provided with cores on opposite sides of said member having poles near the end of said member opposite side yoke for attracting the member to perform connection and disconnection, a coil upon one of said cores in shunt to the generator, and a coil upon the other in shunt to the generator and another coil thereon in series with the generator and battery when they are disconnected by the automatic means.

2. In apparatus of the character described, in combination, a generator, a storage battery, a switch for connecting said generator with said battery, and operating means to automatically close and open said switch so as to connect and disconnect said storage battery and said generator when their voltages are substantially equal even though there are appreciable changes in the battery voltage due to changes in the condition of charge of said battery, said operating means including a movable magnetic member, a substantially C-shaped frame of magnetic material comprising a yoke piece in close magnetic relation to one end of said member and a pair of cores on opposite sides of said member with poles near the other end of said member for attracting said member to close and open said switch, a first voltage coil upon one of said cores, a second voltage coil upon the other of said cores, said voltage coils being connected in parallel across said generator, and a third voltage coil upon said other of said cores in shunt with said switch so as to be in series with said generator and said battery when said switch is open and so as to be substantially deenergized when said switch is closed.

JOHN L. CREVELING.